March 11, 1958  LAWRENCE ICHIJI MIYAMOTO  2,825,970
COMPUTER FOR DETERMINING RAFTER CUTTING ANGLES
Filed April 29, 1954  3 Sheets-Sheet 1
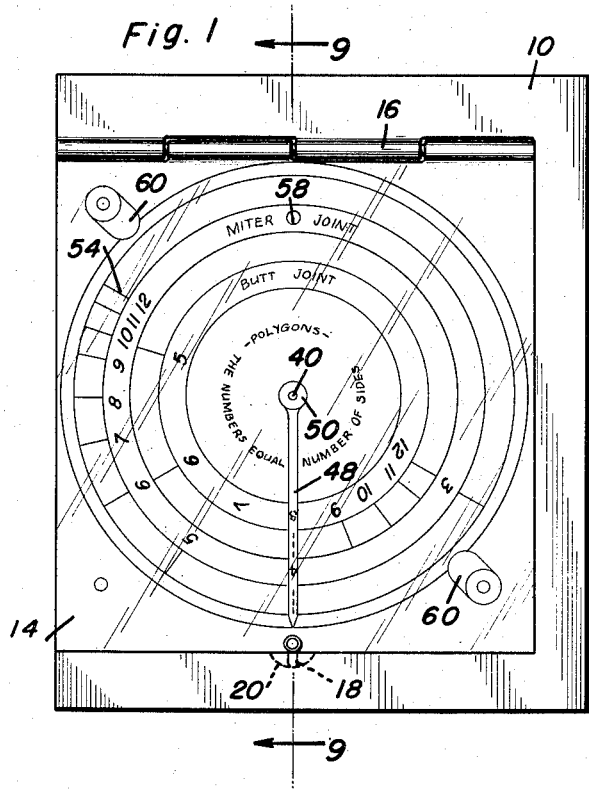
Fig. 1
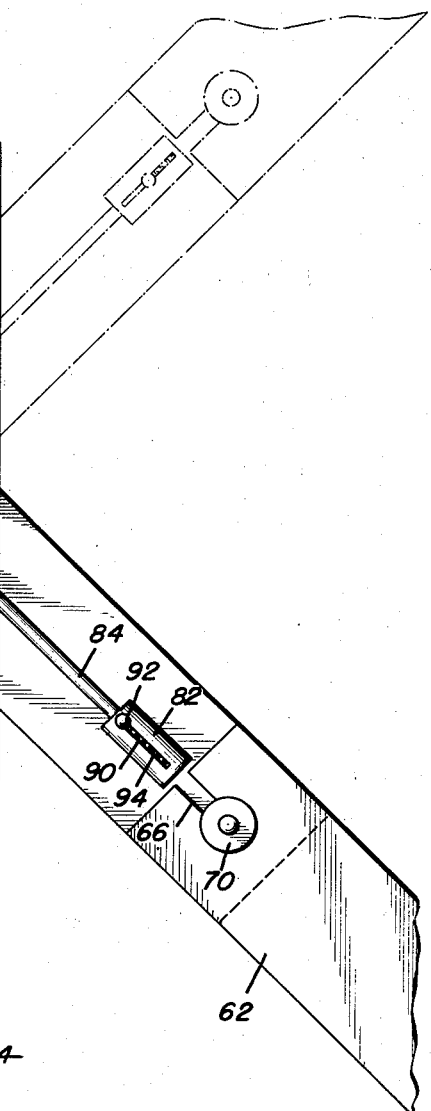
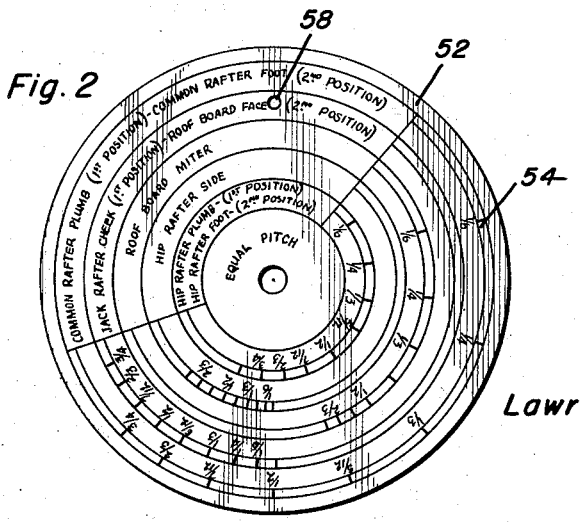
Fig. 2
*Lawrence Ichiji Miyamoto*
INVENTOR.

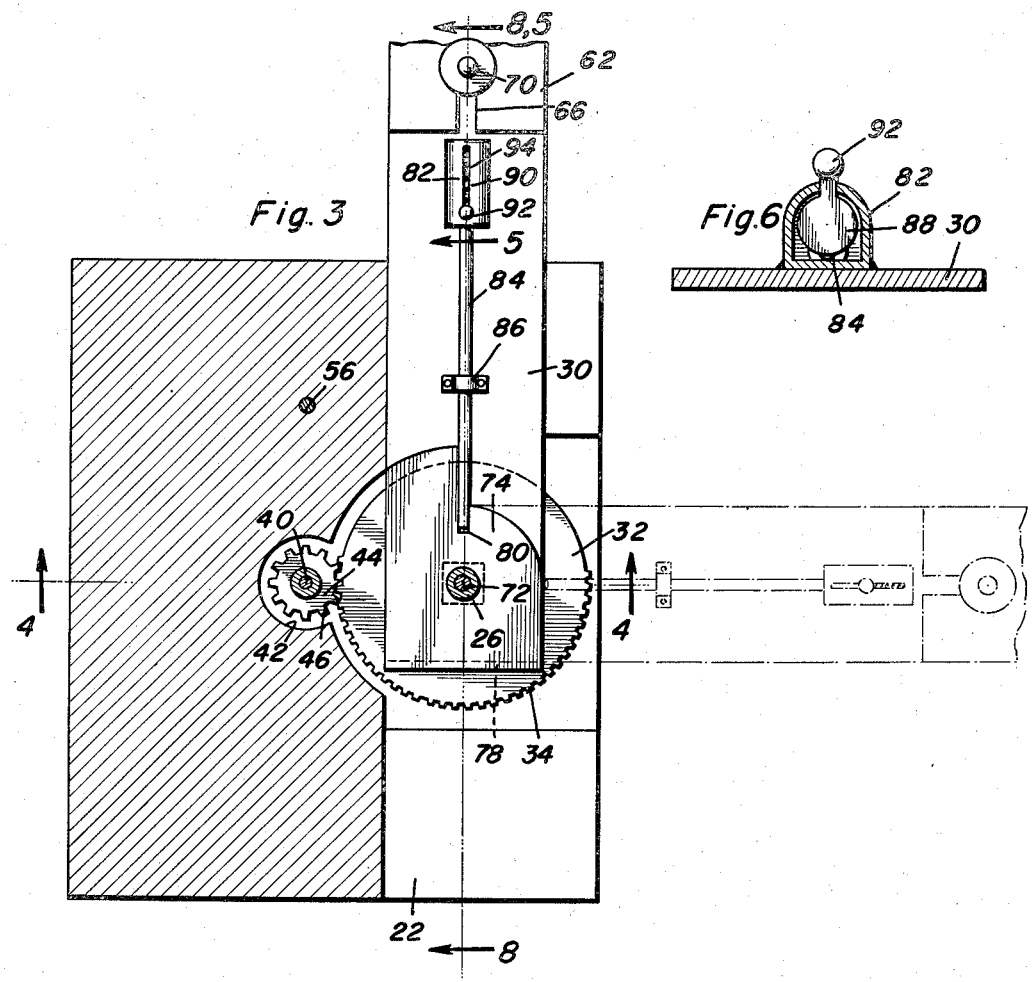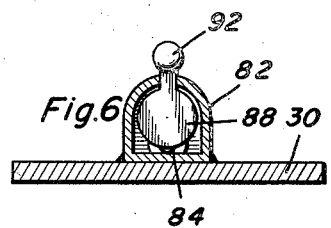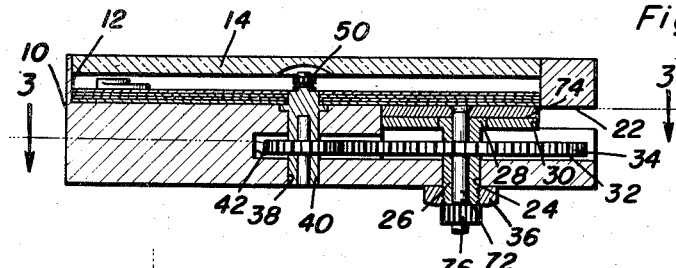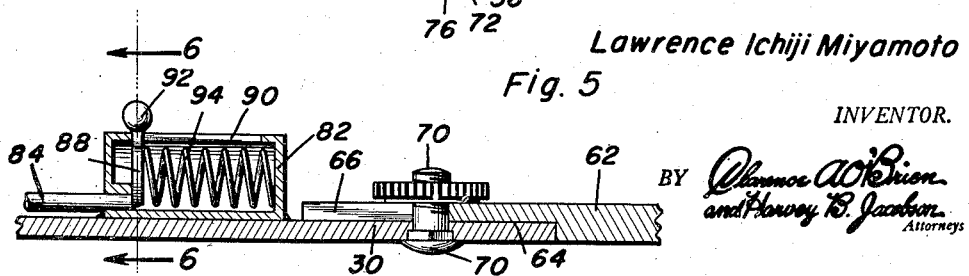

March 11, 1958 LAWRENCE ICHIJI MIYAMOTO 2,825,970
COMPUTER FOR DETERMINING RAFTER CUTTING ANGLES
Filed April 29, 1954 3 Sheets-Sheet 3
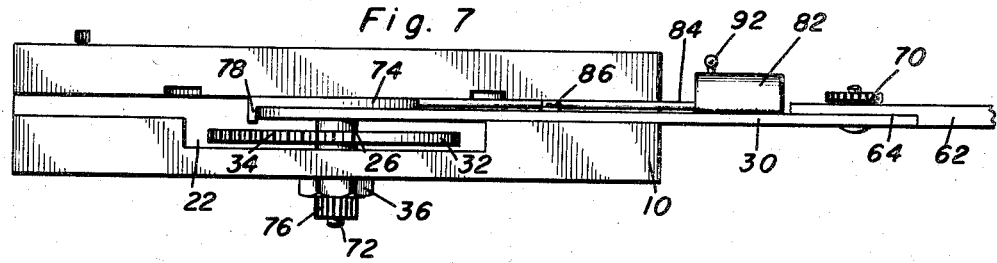
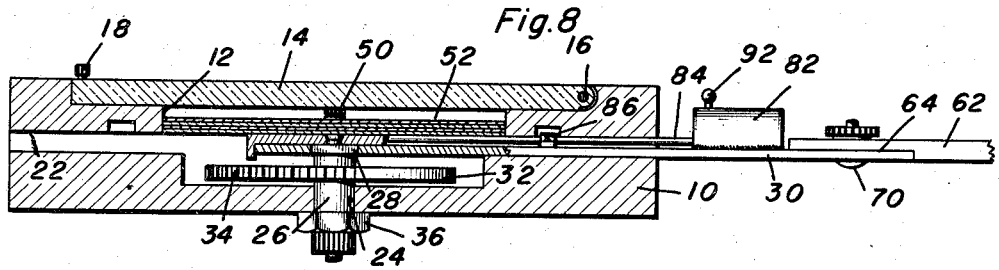
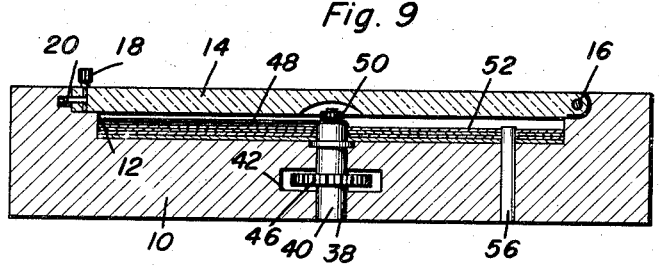
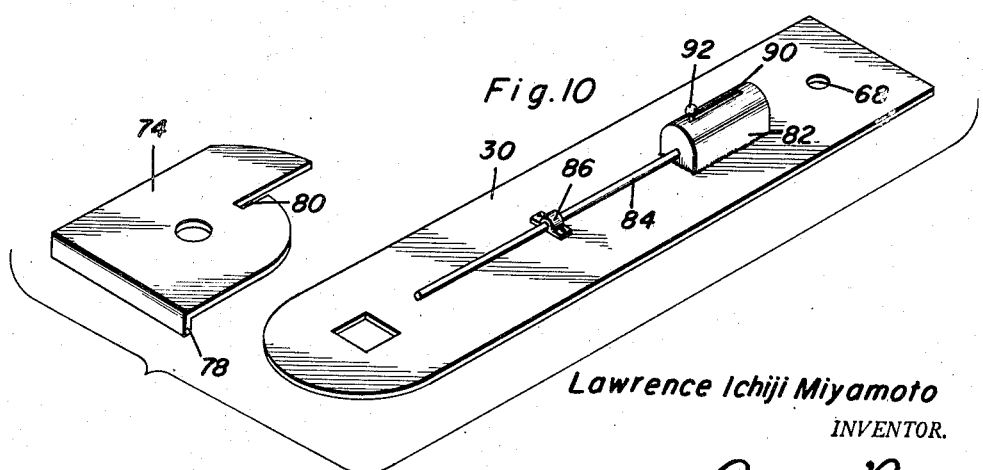
Lawrence Ichiji Miyamoto
INVENTOR.

United States Patent Office 2,825,970
Patented Mar. 11, 1958

2,825,970

COMPUTER FOR DETERMINING RAFTER CUTTING ANGLES

Lawrence Ichiji Miyamoto, Olaa, Territory of Hawaii, assignor of forty-nine percent to Toyoko Miyamoto, Olaa, Territory of Hawaii Application April 29, 1954, Serial No. 426,369

3 Claims. (Cl. 33—75)

This invention relates to a computer for determining rafter cutting angles, and more particularly to a device which can be used for determining the proper angle at which to cut a rafter.

An object of this invention is to provide a computer for determining rafter cutting angles which can be used for cutting members such as jack rafters, roof boards, hip rafters, etc.

Another object of this invention is to provide a computer for determining the rafter cutting angle which will give the angle for cutting all of the various members of a roof.

A further object of this invention is to provide a computer for determining rafter cutting angles having a single movable member whereby the general cut of rafters may be easily and quickly determined.

Yet a further object of this invention is to provide a computer for determining rafter cutting angles which is simple and efficient in construction, and durable and lasting in use.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the computer forming the subject of this invention;

Figure 2 is a top plan view of one of the graduated discs used in conjunction with this invention;

Figure 3 is a sectional view taken substantially along the section line 3—3 of Figure 4;

Figure 4 is a sectional view taken substantially along the sectional line 4—4 of Figure 3;

Figure 5 is a sectional view taken substantially along the section line 5—5 of Figure 3;

Figure 6 is a sectional view taken substantially along the section line 6—6 of Figure 5;

Figure 7 is a side elevational view of the computer forming the subject of this invention;

Figure 8 is a sectional view taken substantially along the section line 8—8 of Figure 3;

Figure 9 is a sectional view taken substantially along the section line 9—9 of Figure 1; and Figure 10 is an exploded perspective view of the arm which is attached to the casing of the computer forming the subject of this invention.

Referring now more particularly to the accompanying drawings, it will be seen that the computer forming the subject of this invention includes, a casing 10 having a recess 12 in the upper face thereof. A cover 14 is secured to one edge of the recess 12 by a suitable hinge 16. The edge of the cover 14 opposite the hinge 16 is provided with a locking member 18 which engages in a recess 20 in one side of the recess 12 for locking the cover in closed position on the casing 10. The cover 14 is formed of translucent material and the casing 10 may be formed of any other suitable material.

As seen in Figure 3 one side of the casing 10 is provided with a longitudinal slot 22 which opens along one entire face of the casing. The slot 22 is positioned in the lower portion of the casing 10 and has the ends thereof opening on opposite ends of the casing. The casing 10 is provided with a vertically extending aperture 24 which intersects the slot 22 midway of its length. Rotatably mounted within the aperture 24 is a hollow shaft 26 which extends within the slot 22. The upper end of the shaft 26 is provided with a radially extending flange 28 which is rectangular in cross section. Secured to the flange 28 and extending radially therefrom is an arm 30. The arm 30 is of such a length as to extend from either end of the slot 22 when the arm 30 extends parallel to the longitudinal axis of the slot 22.

Secured to the shaft 26 for rotation therewith is a driving gear 32. The driving gear 32 is provided with a plurality of teeth 34 which extend throughout one-half of the circumference thereof. A jam nut 36 is threadedly engaged on the end of the shaft 26 which extends below the casing 10 for locking the shaft 26 in adjusted position.

The casing 10 is further provided with a vertically extending aperture 38 which is disposed centrally of the recess 12. Rotatably mounted within the aperture 38 is a shaft 40. A recess 42 is provided in the casing 10 and intersects the slot 22. Disposed within the recess 42 and fixedly secured to the shaft 40 for rotation therewith is a gear 44 having a plurality of teeth 46 thereon which are enmeshed with the teeth 34 on the driving gear 32. Secured to the upper end of the shaft 40 for rotation therewith is a pointer 48. Thus, it will be seen that movement of the arm 30 will cause the rotation of the pointer 48 within the recess 12.

The pointer 48 is mounted on a reduced portion of the shaft 40 and secured thereto so as to be removable therefrom by a nut 50. When the pointer 48 is removed from the shaft 40 a selected one of a plurality of discs 52 may be placed within the recess 12 concentric with the shaft 40. The discs 52 are provided with a plurality of graduations 54 thereon which graduations indicate the various cuts necessary when constructing a roof. As seen in Figure 1, the discs may have graduations 54 thereon which will indicate the cut necessary for forming polygons. In order that the disc 52 will always be properly aligned with the pointer 48, a pin 56 is mounted vertically within the casing 10 and intersecting the recess 12. Each of the discs 52 is provided with an aperture 58 which will receive the pin 56 so as to properly align the discs 52.

In order to retain the discs 52 in position within the recess 12 a pair of lugs 60 are mounted for rotation within the recess 12 and are adapted to be moved into overlying relationship to the edges of the discs 52. When using the device thus far described, a disc having the graduation 54 thereon previously computed for a selected pitch is placed in the uppermost position within the recess 12. Then, the arm 30 is moved until the pointer is coincident with a selected one of the graduations on the discs. Then, the nut 36 is tightened to lock the arm 30 in position and the computer may be placed on a board which is to be cut and the line marked thereon indicating the proper cut.

The arm 30 may be provided with a removable extension when it is desired to use the computer with a board wherein the arm 30 is not of sufficient length to complete the marking thereof. The extension 62 may be of any suitable length and is provided with a recess portion 64 adjacent one end thereof. The recess 64 is adapted to receive the free end of the arm 30. The extension 62 is further provided with a slot 66 extending longitudinally thereof from the end having the recess 64. The arm 30 is provided with an aperture 68 through which a removable fastener 70 may be inserted. The slot 66 is adapted to be aligned with the aperture 68 whereby the removable fastener 70 will extend therethrough to secure the extension 62 on the arm 30. When cutting rafters it is necessary to not only determine the cheek bevel of the rafter, but it is also necessary to determine the roof board face bevel. In order to provide means for automatically determining the roof board face level for a given jack rafter cheek bevel, the computer forming the subject of this invention is provided with a stop which can be set at a predetermined position upon the positioning of the ruler for the jack rafter cheek bevel. This stop comprises a rod 72 rotatably mounted within the hollow shaft 26. A plate 74 is secured to the upper end of the rod 72 in any suitable manner for rotation therewith. Secured to the lower end of the rod 72 is an internally threaded nut 76 whereby the rod 72 can be locked against rotation within the shaft 26.

As seen in Figure 10, the plate 74 is provided with a downwardly extending flange 78 along one edge thereof. This flange 78 extends downwardly a distance equal to the thickness of the arm 30. The side of the plate 74 opposite the flange 78 is provided with a recess 80. The edge of the plate 74 between the recess 80 and the flange 78 is arcuate for a purpose later to be described.

Secured to the arm 30 and extending upwardly therefrom is a housing 82 which is positioned on the arm 30 outwardly of the casing 10. A rod 84 is mounted for sliding movement on the arm 30 by a suitable bracket 86. One end of the arm 84 is received within the housing 82 and is secured to a plate 88 which is adapted for longitudinal movement within the housing 82. The upper surface of the housing 82 is provided with a longitudinally extending slot 90 which receives a projection 92 on the plate 88. A coil spring 94 is disposed within the housing 82 between the plate 88 and one end of the housing for urging the rod 84 outwardly of the housing. The other end of the rod 84 is adapted to be received within the recess 80 of plate 74 to cause the plate 74 to be rotated with the arm 30 when the nut 76 is loosened.

When the arm 30 has been rotated to the desired position and the pointer indicates the desired cheek bevel for a jack rafter, the nut 76 is grasped to hold the plate 74 in fixed position. Then, the rod 84 can be moved out of engagement with the recess 80 and the arm 30 rotated until it comes in contact with the flange 78. This will give the desired roof board face bevel and when the nut 36 is tightened on the shaft 26 and nut 76 tightened on nut 36, the computer can be placed in position on a board and the lines drawn for the correct cut for the roof board face bevel.

When the computer is placed in position on the board for drawing the lines for the cutting angle, one side of the computer is placed against a side edge of the board with the arm 30 extending across the board. The spare discs 52 may be stored in position on the shaft 40 beneath the selected one of the discs 52. When not in use, the extension 62 may be removed from the arm 30 whereby the device will be more compact.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A computer for determining rafter cutting angles comprising a casing, means mounted on said casing and cooperating with a side thereof for indicating the angle for cutting rafters, means on said casing and operatively connected to said first named means for indicating the positioning of said first named means, said casing being provided with a slot along one side thereof, a shaft mounted for rotation on said casing and intersecting said slot, said first named means including an arm secured to said shaft, said arm being mounted for movement into and out of said slot, said casing having adjustable means thereon adapted to be selectively positioned to limit movement of said arm between predetermined limits, said adjustable means including a plate that has an opening through which said shaft is passed, said plate rotationally adjustable on said shaft to selected positions with respect to said arm, a flange along one edge of said plate so that when said arm has been rotated to the desired position said plate may be temporarily held and said arm rotated until it comes into contact with said flange to form a set for the particular rafter angle that is desired, and means for locking said plate in the adjusted position.

2. The combination of claim 1 wherein said arm is provided with a spring pressed rod, said plate being provided with a recess receiving said rod for connecting said plate to said arm.

3. The combination of claim 1 wherein said plate is superimposed on the inner extremity of said arm and said flange is located beyond the inner end of said arm.

References Cited in the file of this patent

UNITED STATES PATENTS

| | | |
|---|---|---|
| 285,405 | Goldsberry | Sept. 25, 1883 |
| 483,499 | McChesney | Sept. 27, 1892 |
| 2,000,926 | Cox | May 14, 1935 |
| 2,176,798 | Hines | Oct. 17, 1939 |
| 2,517,667 | Holkenbrink | Aug. 8, 1950 |

FOREIGN PATENTS

| | | |
|---|---|---|
| 1,737 | France | Mar. 25, 1846 |
| 19,337 | Great Britain | Sept 7, 1904 |
| 200,894 | Germany | Aug. 3, 1908 |